United States Patent
Pritz et al.

(10) Patent No.: US 11,592,623 B2
(45) Date of Patent: Feb. 28, 2023

(54) OPTICAL WAVEGUIDE CONNECTOR ASSEMBLY

(71) Applicant: MD ELEKTRONIK GmbH, Waldkraiburg (DE)

(72) Inventors: Helmut Pritz, Ampfing (DE); Thomas Halbig, Dietfurt (DE); Heinrich Axt, Muehldorf am Inn (DE)

(73) Assignee: MD ELEKTRONIK GMBH, Waldkraiburg (DE)

( * ) Notice: Subject to any disclaimer, the term of this patent is extended or adjusted under 35 U.S.C. 154(b) by 0 days.

(21) Appl. No.: 17/546,096

(22) Filed: Dec. 9, 2021

(65) Prior Publication Data

US 2022/0187544 A1 Jun. 16, 2022

(30) Foreign Application Priority Data

Dec. 16, 2020 (DE) ...................... 10 2020 133 767.1

(51) Int. Cl.
*G02B 6/36* (2006.01)
*G02B 6/38* (2006.01)

(52) U.S. Cl.
CPC ........... *G02B 6/3825* (2013.01); *G02B 6/387* (2013.01); *G02B 6/3897* (2013.01)

(58) Field of Classification Search
CPC .... G02B 6/3825; G02B 6/387; G02B 6/3897; G02B 6/4204; G02B 6/36
See application file for complete search history.

(56) References Cited

U.S. PATENT DOCUMENTS

| | | | |
|---|---|---|---|
| 8,639,073 B2* | 1/2014 | Pelletier | G02B 6/262 385/37 |
| 9,910,226 B2* | 3/2018 | Howard | G02B 6/36 |
| 2005/0025436 A1 | 2/2005 | Saito et al. | |
| 2008/0232737 A1 | 9/2008 | Ishigami et al. | |
| 2012/0063725 A1* | 3/2012 | Meadowcroft | G02B 6/3885 385/88 |
| 2013/0156385 A1 | 6/2013 | Ishigami et al. | |
| 2015/0341066 A1 | 11/2015 | Hsieh | |

FOREIGN PATENT DOCUMENTS

DE 102006045271 A1 3/2008

* cited by examiner

*Primary Examiner* — Jennifer Doan
(74) *Attorney, Agent, or Firm* — Leydig, Voit & Mayer, Ltd.

(57) ABSTRACT

A connector assembly includes a connector, an optical waveguide and a circuit board having a through-hole and a transmitter/receiver configured to transmit and/or receive light signals. The connector is interlockingly and releasably connected to the circuit board via a fastening element which is passed through the through-hole and connected to the circuit board. The connector has a receiving chamber which at least partially borders the transmitter/receiver. A lens unit is disposed in the receiving chamber and light-conductively connects the transmitter/receiver to the optical waveguide. A locking element is movably disposed on the connector. The locking element is disposed at least partially within the receiving chamber and secures the lens unit in the receiving chamber. The locking element is movable into a final latched position in which the locking element extends at least partially into the through-hole and blocks release of the fastening element from the circuit board.

17 Claims, 3 Drawing Sheets

OPTICAL WAVEGUIDE CONNECTOR ASSEMBLY

CROSS REFERENCE TO RELATED APPLICATION

This application claims benefit to German Patent Application No. DE 10 2020 133 767.1, filed on Dec. 16, 2020, which is hereby incorporated by reference herein.

FIELD

The invention relates to a connector assembly including a connector, an optical waveguide, and a circuit board. The optical waveguide is connectable to the circuit board via the connector, the connector being releasably connected to the circuit board.

BACKGROUND

Due to the increasing digitalization and miniaturization of products and processes and the resulting ever-increasing amounts of data, there is also an increasing demand for space-saving and cost-effective data connections that enable high data transfer rates. Since optical waveguides are particularly suitable for achieving high data transfer rates, the use of optical waveguides as data transmission means is becoming increasingly more interesting. However, the use of optical waveguides is also associated with drawbacks. For example, in order to transmit data via optical waveguides, an electrical signal must first be converted into a light signal which can then be fed into an optical waveguide. Subsequently, after the light signal has passed through the optical waveguide, the light signal must be coupled out of the optical waveguide and converted back into an electrical signal. Consequently, connector systems that connect optical waveguides to corresponding connection partners are comparatively complex and costly in construction, which often has a negative effect on the amount of space required by the design. Furthermore, for data transmission via optical waveguides, significantly more components are usually required than with comparable RF conductors, which transmit data electrically. As compared to said RF conductors, transmission systems using optical waveguides therefore not only are more costly, but typically also require greater assembly effort due to the additional components required.

SUMMARY

In an embodiment, the present disclosure provides a connector assembly including a connector, an optical waveguide and a circuit board having at least one first through-hole and a transmitter/receiver configured to transmit and/or receive light signals. The connector is interlockingly and releasably connected to the circuit board via at least one fastening element which is passed through the first through-hole and connected to the circuit board. The connector has a first receiving chamber which at least partially borders the transmitter/receiver. A lens unit is disposed in the first receiving chamber and light-conductively connects the transmitter/receiver to the optical waveguide. A locking element is movably disposed on the connector. The locking element is disposed at least partially within the first receiving chamber and secures the lens unit in the first receiving chamber. The locking element is movable into a final latched position in which the locking element extends at least partially into the first through-hole and blocks release of the at least one fastening element from the circuit board.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
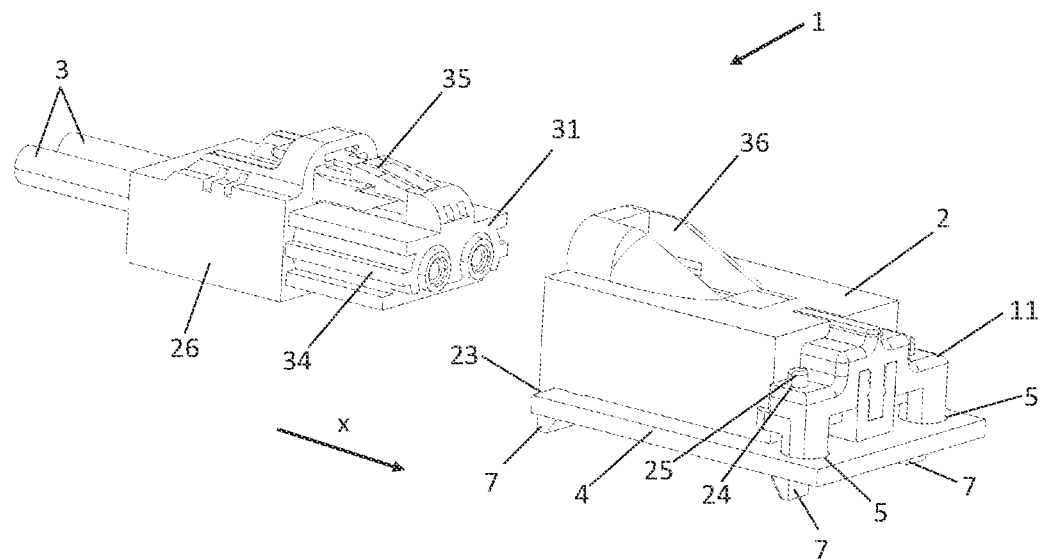
FIG. 1 is a three-dimensional view of a first embodiment of the connector assembly in accordance with the invention.

In an embodiment, the present invention overcomes at least one of the disadvantages of the above-mentioned prior art and provides a connector assembly for optical waveguides that requires little space and also little effort for assembly.

The connector assembly of an embodiment of the invention includes a connector, an optical waveguide, and a circuit board. The circuit board has at least one first through-hole and a transmitter/receiver unit for transmitting and/or receiving light signals. The through-hole preferably extends perpendicularly through the circuit board. The transmitter/receiver unit is preferably electrically conductively connected to the circuit board, so that electrical signals can be transmitted between the circuit board and the transmitter/receiver unit. The transmitter/receiver unit is preferably designed to convert electrical signals into light signals and/or light signals into electrical signals. The connector is interlockingly and releasably connected to the circuit board. In accordance with an embodiment of the invention, the connection between the connector and the circuit board is made by means of at least one fastening element which is disposed on the connector and passed through the first through-hole. The fastening element may take the form of, for example, a latching hook. Preferably, the fastening elements is formed integrally with and of the same material as the connector. The fastening element is connected to the circuit board and particularly preferably latched thereto.

The connector has a first receiving chamber which at least partially borders the transmitter/receiver unit. Preferably, the receiving chamber is open toward the transmitter/receiver unit. A lens unit is disposed in the first receiving chamber. The lens unit may be composed of a light-conducting plastic material such as polymethyl methacrylate or polycarbonate. The lens unit light-conductively connects the transmitter/receiver unit to the optical waveguide. Preferably, the optical waveguide is releasably mechanically connected to the connector. Furthermore, a locking element is movably disposed on the connector. The locking element is disposed at least partially within the first receiving chamber and secures the lens unit in the first receiving chamber. The securement of the lens unit by the locking element may be accomplished, for example by the lens unit being clamped between the locking element and an inner wall of the first receiving chamber. Preferably, the lens unit is stationarily secured by the locking element in the first receiving chamber so that movement of the lens unit within the first receiving chamber is hindered by the locking element. Preferably, the locking element is disposed partially outside and partially within the first receiving chamber, it being particularly preferred in this context that the first receiving chamber have an access opening through which the locking element extends into the first receiving chamber. The locking element is movable into a final latched position in which the locking element extends at least partially into the first through-hole and blocks release of the fastening element from the circuit board. If the locking element is disposed partially outside and partially within the first receiving chamber, it is preferred that a portion of the locking element located outside the first receiving room extend into the first through-hole. If the circuit board has a plurality of first through-holes, a plurality of fastening elements may be provided on the connector so that a plurality of first through-holes may have fastening elements disposed therein which are connected to the circuit board. In this case, the locking element may extend into a plurality of through-holes. Preferably, the locking element secures the lens element in the first receiving chamber both in and outside the final latched position.

The inventive connector assembly can be easily, releasably mounted by connecting the connector to the circuit board via the fastening element. This not only ensures reusability of the connector assembly, but also makes it possible to at least partially implement a modular system, since, for example, the connector can be arranged on different circuit boards or a circuit board can be equipped with a wide variety of connectors as long as the arrangement of the first through-holes matches the arrangement of the fastening elements of the connector. The ease of disassembly also enables easy separation of the components when the connector assembly is to be disposed of at the end of its service life. Since the locking element provides a double function by securing the lens unit and blocking the fastening element, the degree of complexity of the connector assembly can be kept low.

The lens unit may have a first coupling surface that is light-conductively coupled to an end face of the optical waveguide and a second coupling surface that is light-conductively coupled to a communication side of the transmitter/receiver unit. The first coupling surface is preferably disposed perpendicular to the second coupling surface. Thus, the optical waveguide can be disposed parallel to the circuit board. This enables the space available on the circuit board to be used more effectively. The first and/or second coupling surface(s) may have a surface finish that promotes in-coupling and/or out-coupling of light into or from the lens unit. This can be achieved, for example, with a coating. The end face and/or the communication side may also have a corresponding surface finish, for example in the form of a coating. The communication side may be understood to be the side of the transmitter/receiver unit where the transmitter/receiver unit can detect and/or emit light signals. The communication side is preferably parallel to the circuit board.

The first coupling surface, at least in some sections thereof, may have a shape complementary to the end face. Alternatively or additionally, the second coupling surface, at least in some sections thereof, may have a shape complementary to the communication side. The end face and/or the communication side may, for example, have elevations and/or depressions. A complementary shape of the first and/or second coupling surface(s) makes it possible not only to enhance light transmission between the lens unit and the optical waveguide and/or the transmitter/receiver unit, but also to simplify the positioning between the lens unit and the end face and/or the communication side. For example, the end face may have a depression into which may be placed a complementary elevation of the lens unit.

The lens unit may have a first and a second lens element, each having a first and a second coupling surface, so that two optical waveguides can be light-conductively coupled to the communication side. Preferably, two optical waveguides are coupled to a transmitter/receiver unit so that the transmitter/receiver unit may preferably use one optical waveguide for transmitting light signals and one optical waveguide for receiving light signals. The first and second lens elements are preferably structurally interconnected via a connecting portion. Preferably, the first coupling surfaces of the two lens elements and the second coupling surfaces of the two lens elements are respectively disposed in one plane. The lens elements and the connecting portion are preferably formed of the same material and/or in one piece.

The locking element may have a securing rib which is disposed in the first receiving chamber and butted against the connecting portion. The securing rib is preferably located between the first and second lens elements, at least when in the final latched position. Preferably, the securing rib has a width that is less than the distance by which the first and second lens elements are spaced apart from each other by the connecting portion. The width of the securing rib may be understood here to be a dimension of the securing rib that runs parallel to the circuit board and perpendicular to a plugging direction. Furthermore, it is preferred that the securing rib be inserted through the access opening into the first receiving chamber.

In order to enable easy alignment and positioning of the connector on the circuit board, the circuit board may have at least one second through-hole in which a positioning dome of the connector is disposed. The positioning dome may be disposed on a side of the connector facing the circuit board. Furthermore, the positioning dome is preferably formed integrally with the connector. In a further embodiment of the invention, the positioning dome may be used to fix the connector to the circuit board. This can be accomplished by, for example, by deforming the positioning dome. Alternatively, an additional fastening means, such as a screw cap, may be attached to the positioning dome.

The circuit board may have two first through-holes and one second through-hole. It is especially preferred that the second through-hole have the same distance to both first through-holes, and that the two first through-holes and the second through-hole form the corners of an equilateral triangle. This not only ensures that the connector is correctly positioned on the circuit board.

The transmitter/receiver unit may be disposed within the equilateral triangle formed by the first through-holes and the second through-hole. More particularly, either the entire transmitter/receiver unit or at least a substantial portion thereof may be disposed within the equilateral triangle. This not only allows for a space-saving arrangement on the circuit board, but also enables the connector to be easily and reliably positioned in the region of the transmitter/receiver unit.

The connector may be disposed in an edge region of the circuit board and may have at least one additional fastening element which is connected in particular to an outer edge of the circuit board, in particular latched thereto. It is particularly preferred here that the connector have at least three fastening elements, two fastening elements being connected to the circuit board in two first through-holes and one fastening element being connected thereto at the outer edge. In this case, it is preferred that the three fastening elements be configured as latching hooks and form an equilateral triangle. Alternatively, the connector may have four fastening elements. In this case, it is preferred that two fastening elements be connected to the circuit board within two first through-holes and two fastening elements be connected to the outer edge of the circuit board. In this case, the fastening elements are preferably configured as latching hooks and arranged in a rectangle.

The locking element may be movable perpendicularly to the circuit board into a pre-latched position. In the pre-latched position, the locking element is preferably located outside the first through-hole. It is preferred that in the pre-latched position, too, the locking element secure the lens unit in the first receiving chamber. Furthermore, the locking element is preferably movable (e.g., by sliding) between the pre-latched position and the final latched position.

The locking element may have at least one bore through which extends a guide pin disposed on the connector. Therefore, the guide pin is preferably disposed perpendicular to the circuit board and in particular parallel to a direction of movement of the locking element. The guide pin may have a length at least equal to a distance traveled by the locking element between the pre-latched position and the final latched position. Especially when the locking element is moved between the pre-latched position and the final latched position, it can be ensured by the bore and the guide pin that the locking element can be reliably inserted into and removed from the first through-hole. It has been found that it is particularly advantageous if the connector has two guide pins, each disposed within a bore in the locking element. In this case, it is particularly preferred that the portion of the locking element that is located within the first receiving chamber be disposed between the bores.

The optical waveguide may have a mating connector which is releasably connected to the connector and is disposed at least partially within a socket of the connector. It is also possible that a plurality of optical waveguides may have a common connector. For example, two optical waveguides may be connected by a common mating connector. The mating connector is preferably releasably connectable to the connector.

The socket may be connected to the first receiving chamber via at least one connecting opening. The lens unit may be disposed partially within the connecting opening. The lens unit may be configured to match a contour of the connecting opening within the connecting opening so that the connecting opening is filled by the lens unit. Moreover, the lens unit may extend through the connecting opening into the socket.

In addition to the first receiving chamber in which the lens unit is disposed, the connector may have a second receiving chamber in which the transmitter/receiver unit is disposed. The second receiving chamber is preferably open toward the first receiving chamber. Between the first and second receiving chambers, there may be disposed a support shelf, which is preferably parallel to the circuit board. The lens unit may rest at least partially on the support shelf.

The first receiving chamber may have a first partition, and the second receiving chamber may have a second partition. The first and second partitions preferably separate the first and second receiving chambers from the socket. Therefore, it is particularly preferred that both the first partition and the second partition be arranged parallel to each other, perpendicular to the circuit board, and perpendicular to the plugging direction. If the socket is connected to the first receiving chamber via at least one connecting opening, the connecting opening is preferably disposed in the first partition. Furthermore, it is preferred that the first partition be offset in a plugging direction from the second partition so that a step is formed within the socket.

A first ratio may be formed by a height of a wall of the connector in the region of the socket, which wall rests against the circuit board, and a height of the step. A second ratio may be formed by a length of the transmitter/receiver unit and a length of a reflective surface. The reflective surface preferably has the function of causing light that is coupled into the lens unit from the optical waveguide and/or the transmitter/receiver unit to be reflected toward the transmitter/receiver unit or the optical waveguide. Preferably, the first ratio corresponds to the reciprocal of the second ratio. It is also preferred that the second ratio have a value between 1 and 3. "Ratio" may be understood in this context as the result of a division. "Length" may be understood in this context as a dimension that runs parallel to the plugging direction. "Height" may be understood in this context as a dimension that extends perpendicular to the circuit board.

The reflective surface may be contiguous with the first and second coupling surfaces and cause light that is coupled into the lens unit from the first or second coupling surface to be reflected toward the second or first coupling surface. Preferably, the reflective surface causes the light introduced into the lens unit to be totally internally reflected between the two coupling surfaces. The total internal reflection is preferably effected by the shape of the reflective surface, so that light introduced from the coupling surfaces strikes the reflective surface at an angle that results in total internal reflection at the reflective surface.

A third ratio may be formed by a height of the transmitter/receiver unit and a distance between a center point of the first coupling surface and the circuit board. The height of the transmitter/receiver unit may also be understood to be the distance of the communication surface from the circuit board. A fourth ratio may be formed by the distance of a center point of the communication surface from a wall of the transmitter/receiver unit that preferably abuts the second partition and a distance of the first surface portion from the second surface portion. The third ratio is preferably equal to the reciprocal of the fourth ratio. Preferably, the fourth ratio has a value between 1 and 3.

The mating connector may have at a plug end a first surface portion abutting the first partition and a second surface portion abutting the second partition. It is therefore preferred that the first surface portion be offset in the plugging direction from the second surface portion.

FIG. 1 shows, in three-dimensional view, a first embodiment of an inventive connector assembly 1. Connector assembly 1 includes a connector 2, a circuit board 4, and two optical waveguides 3 which are interconnected by a mating connector 26. Circuit board 4 has two first through-holes 5. Connector 2 has four fastening elements 7, which in the present embodiment take the form of latching hooks. Connector 2 is releasably connected to circuit board 4 via fastening elements 7. Two of the fastening elements 7 are disposed within first through-holes 5 and are latched to circuit board 4. The two other fastening elements 7 are disposed at an outer edge 23 of circuit board 4 and latched to outer edge 23. Connector 2 further has a locking element 11 disposed thereon. Locking element 11 is movable perpendicularly to circuit board 4 between a final latched position and a pre-latched position. In the view shown, locking element 11 is in a final latched position. Locking element 11 is disposed in the two first through-holes 5, thereby blocking release of the fastening elements 7 that are also disposed in first through-holes 5. Locking element 11 has two bores 24 in each of which is disposed a guide pin 25 of connector 2. This provides guidance for the movement of locking element 11.

A plug end 31 of mating connector 26, which faces connector 2, is insertable in a plugging direction x into a socket of connector 2. Mating connector 26 further has keying means 34 in the form of various ribs and recesses to ensure that mating connector 26 can only be inserted into a connector 2 provided for this purpose. To ensure that mating connector 26 remains connected to connector 2, mating connector 26 has a primary latching hook 35 that snaps into engagement with a yoke 36 on connector 2, so that primary latching hook 35 is interlockingly and releasably connectable to yoke 36.

Figure 2:
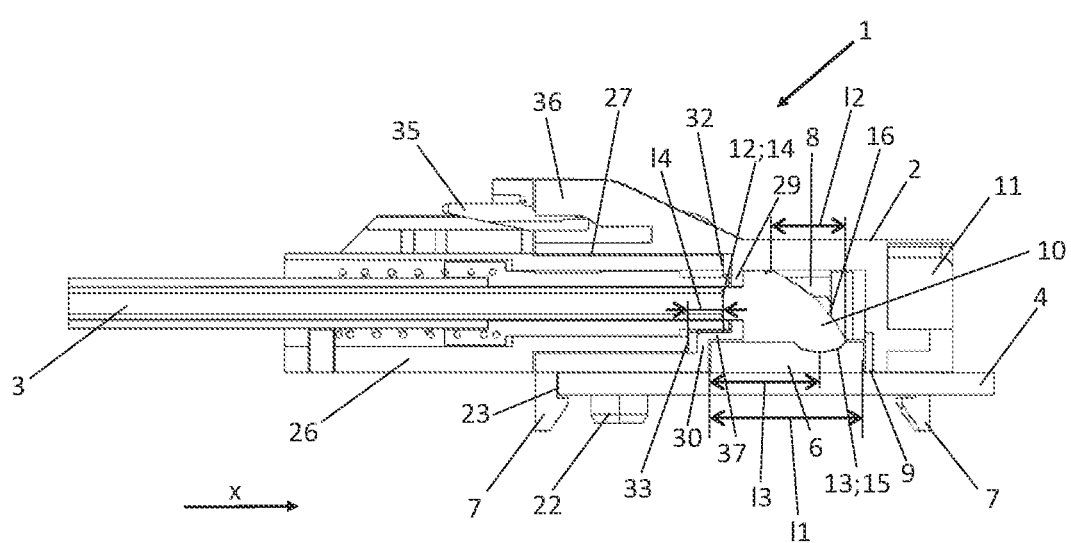
FIG. 2 is a sectional view of the inventive connector assembly according to the first embodiment.

FIG. 2 shows the inventive connector assembly 2 according to the first embodiment in sectional view. The sectional plane extends through one of the optical waveguides 3 parallel to plugging direction x. Connector 2 has a first receiving chamber 8 and a second receiving chamber 9, both of which are adjacent to socket 27, in which mating connector 26 is disposed. First receiving chamber 8 is separated from socket 27 by a first partition 29. Second receiving chamber 9 is separated from socket 27 by a second partition 30. First partition 29 is offset in plugging direction x from second partition 30 so that a step 37 is formed within socket 27. Mating connector 26 has at its plug end 31 a first surface portion 32 and a second surface portion 33, first surface portion 32 also being offset in plugging direction x from second surface portion 33. Thus, first surface portion 32 abuts first partition 29, and second surface portion 33 abuts second partition 30. First receiving chamber 8 is open toward second receiving chamber 9. A lens unit 10 is disposed in first receiving chamber 8. Lens unit 10 is secured in first receiving chamber 8 by locking element 11. A transmitter/receiver unit 6 for transmitting and/or receiving light signals is disposed in second receiving chamber 9. Transmitter/receiver unit 6 is electrically conductively connected to circuit board 4. Lens unit 10 light-conductively connects optical waveguides 3 to transmitter/receiver unit 6. Therefore, first partition 29 has connecting openings 28 through which lens unit 10 extends into socket 27. Lens unit 10 is light-conductively connected via a first coupling surface 12 to an end face 14 of optical waveguide 3. Lens unit 10 further has a second coupling surface 13, which is light-conductively and light-transmittingly connected to a communication side 15 of the transmitter/receiver unit 6. Communication side 15 has a depression in which is disposed a complementarily shaped bulge of second coupling surface 13 to simplify the positioning of lens unit 10 on transmitter/receiver unit 6. Since communication side 15 is disposed perpendicular to the front side 14, and consequently first coupling surface 12 is disposed perpendicular to second coupling surface 13, lens unit 10 additionally has a reflective surface 16. Light which is coupled into lens unit 10 through a respective coupling surface 12; 13 is reflected by reflective surface 16 to the respective other coupling surface 13; 12.

Figure 3:
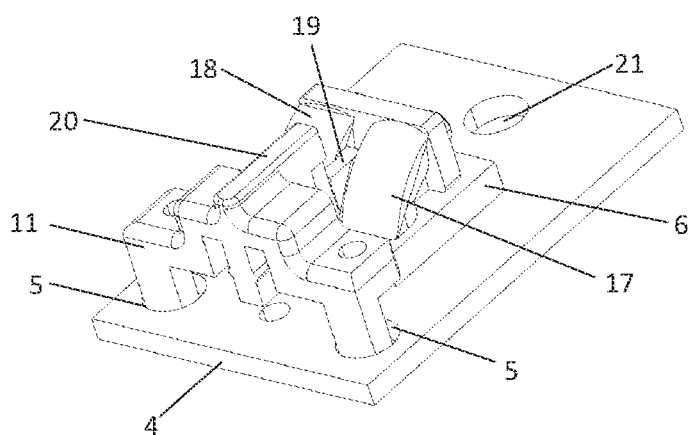
FIG. 3 is a three-dimensional view of a circuit board of the inventive connector assembly according to the first embodiment.

FIG. 3 shows a three-dimensional view of circuit board 4 with transmitter/receiver unit 6, lens unit 10, and locking element 11 in accordance with the first embodiment. For the sake of clarity, the connector is omitted from this view. Circuit board 4 has a second through-hole 21 in addition to the first two through-holes 5. Through-holes 5; 21 are arranged relative to one another to form the corners of an equilateral triangle, second through-hole 21 having the same distance to both first through-holes 5. Lens unit 10 includes a first lens element 17 and a second lens element 18. Each lens element 17; 18 has a first and a second coupling surface, so that two optical waveguides can be connected to the transmitter/receiver unit 6 via lens unit 10. First lens element 17 is connected to second lens element 18 via a connecting portion 19. Connecting portion 19 is formed of the same material as and integrally with first and second lens elements 17; 18. Locking element 11 includes a securing rib 20 which is disposed at connecting portion 19 between lens elements 17; 18 and thus secures lens unit 10 in the first receiving chamber of the socket and retains it in position. In the present embodiment, connecting portion 19 is also partially rib-shaped to simplify the placement of securing rib 20 at connecting portion 19.

Figure 4:
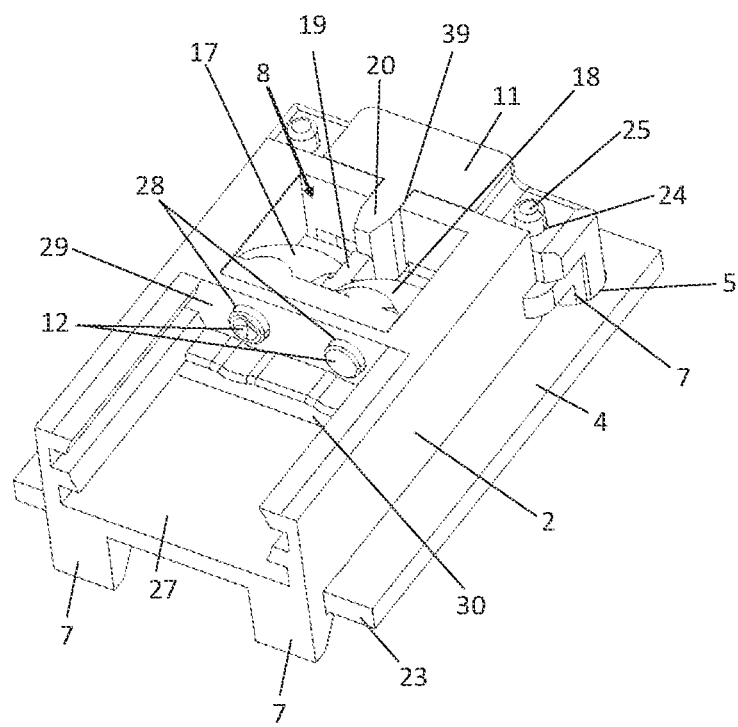
FIG. 4 is a three-dimensional sectional view of a connector of the inventive connector assembly according to the first embodiment.

FIG. 4 shows a three-dimensional view of a connector 2 for the inventive connector assembly according to the first embodiment, with a section taken along a plane parallel to circuit board 4 to allow a view into first receiving chamber 8. Connector 2 has formed in its rear wall a lateral aperture 39 through which securing rib 20 of locking element 11 extends into first receiving chamber 8. Locking element 11 presses the lens unit against the first partition 29 via securing rib 20. Since lens unit 10 is disposed in connecting openings 28, lens unit 10 is thereby fixed in its position in first receiving chamber 8.

Figure 5:
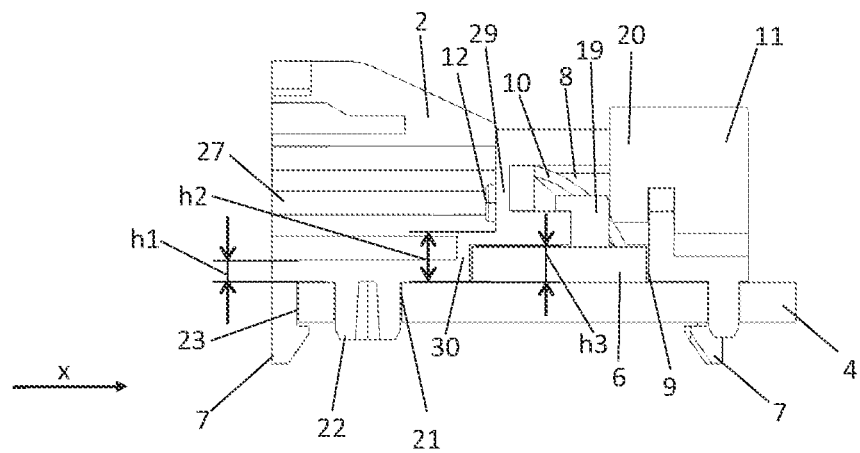
FIGS. 5 and 6 are further sectional views of the connector of the inventive connector assembly according to the first embodiment.
Figure 6:
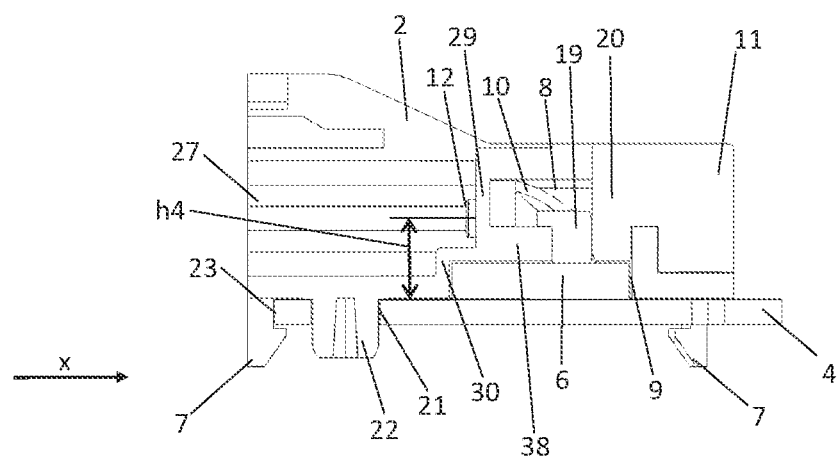

FIGS. 5 and 6 show further sectional views of connector 2 in accordance with the first embodiment, the sectional plane extending perpendicular to circuit board 4 and parallel to plugging direction x. Furthermore, the sectional plane extends centrally between the first and second lens elements. In FIG. 5, locking element 11 is located in the pre-latched position, and in FIG. 6 in a final latched position. In the pre-latched position, locking element 11 is located outside first through-holes 5, so that latching hooks 7 of connector 2 can be easily released from circuit board 4. The height of securing rib 20 is selected such that securing rib 20 is disposed at connecting portion 19 and secures lens unit 10 in first receiving chamber 8 both in the pre-latched position and in the final latched position. Furthermore, a support shelf 38 extending parallel to circuit board 4 is disposed between first and second receiving chambers 8; 9. Lens unit 10 rests partially on support shelf 38. Moreover, support shelf 38 extends between the first and second lens elements. Connector 2 further has a positioning dome 22, which is disposed within second through-hole 21. Positioning dome 22 is formed integrally with connector 2 and serves to enable rapid and reliable positioning of connector 2 on circuit board 4. Also, in the installed state, positioning dome 22 is capable of absorbing forces which act on connector 2 substantially transversely to plugging direction x, so that accidental release of connector 2 is prevented.

In order to ensure a particularly compact design for the connector assembly while at the same time providing for light transmission with particularly low losses, a height h1 of a wall of connector 2 which is located in the region of socket 27 and rests against circuit board 4 is selected such that the height h1 and a step height h2 form a first ratio which is equal to the reciprocal of a second ratio of the length 11 of transmitter/receiver unit 2 and the length 12 of the reflective surface (see FIG. 2). In addition, a third ratio of the height h3 of the transmitter/receiver unit 6 and the height h4 of a center point of the first coupling surface 12 above the circuit board 4 is equal to the reciprocal of a fourth ratio. The fourth ratio is formed by a distance 13 of a center point of communication surface 15 from a wall of transmitter/receiver unit 6 that abuts second partition 30 and the distance 14 of first surface portion 32 from second surface portion 33 (see FIG. 2).

The explanations provided with regard to the figures are merely for the sake of illustration and are not to be construed as limiting.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE NUMERALS 1 connector assembly
2 connector
3 optical waveguide
4 circuit board
5 first through-hole
6 transmitter/receiver unit
7 fastening element
8 first receiving chamber
9 second receiving chamber
10 lens unit
11 locking element
12 first coupling surface
13 second coupling surface
14 end face
15 communication side
16 reflective surface
17 first lens element
18 second lens element
19 connecting portion
20 securing rib
21 second through-hole
22 positioning dome
23 outer edge
24 bore
25 guide pin
26 mating connector
27 socket
28 connecting opening
29 first partition
30 second partition
31 plug end
32 first surface portion
33 second surface portion
34 keying means
35 primary latching hook
36 yoke
37 step
38 support shelf
39 lateral aperture

What is claimed is:

1. A connector assembly, comprising:
a connector;
an optical waveguide;
a circuit board having at least one first through-hole and a transmitter/receiver configured to transmit and/or receive light signals, the connector being interlockingly and releasably connected to the circuit board via at least one fastening element which is passed through the first through-hole and connected to the circuit board, the connector having a first receiving chamber which at least partially borders the transmitter/receiver;
a lens unit disposed in the first receiving chamber that light-conductively connects the transmitter/receiver to the optical waveguide; and
a locking element movably disposed on the connector, the locking element being disposed at least partially within the first receiving chamber and securing the lens unit in the first receiving chamber, and the locking element being movable into a final latched position in which the locking element extends at least partially into the first through-hole and blocks release of the at least one fastening element from the circuit board.

2. The connector assembly as recited in claim 1, wherein the lens unit has a first coupling surface, which is light-conductively coupled to an end face of the optical waveguide, and a second coupling surface, which is light-conductively coupled to a communication side of the transmitter/receiver, the first coupling surface being disposed perpendicular to the second coupling surface.

3. The connector assembly as recited in claim 2, wherein the first coupling surface, at least in some sections thereof, has a shape complementary to the end face of the optical waveguide and/or the second coupling surface, at least in some sections thereof, has a shape complementary to the communication side of the transmitter/receiver.

4. The connector assembly as recited in claim 2, wherein the lens unit has a first and a second lens element, each having a first and a second coupling surface, so that two optical waveguides are light-conductively coupled to the communication side of the transmitter/receiver, the first and second lens elements being interconnected via a connecting portion.

5. The connector assembly as recited in claim 4, wherein the locking element has a securing rib which is disposed in the first receiving chamber and abuts against the connecting portion.

6. The connector assembly as recited in claim 1, wherein the circuit board has at least one second through-hole in which a positioning dome of the connector is disposed.

7. The connector assembly as recited in claim 6, wherein the circuit board has two first through-holes and one second through-hole, the second through-hole having a same distance to both first through-holes, and the two first through-holes and the second through-hole forming corners of an equilateral triangle.

8. The connector assembly as recited in claim 7, wherein the transmitter/receiver is disposed within the equilateral triangle.

9. The connector assembly as recited in claim 1, wherein the connector is disposed in an edge region of the circuit board and has at least one additional fastening element which is connected to an outer edge of the circuit board.

10. The connector assembly as recited in claim 1, wherein the locking element is movable perpendicularly to the circuit board into a pre-latched position in which the locking element is located outside the first through-hole.

11. The connector assembly as recited in claim 1, wherein the locking element has at least one bore through which extends a guide pin disposed on the connector.

12. The connector assembly as recited in claim 1, wherein the optical waveguide has a mating connector which is releasably connected to the connector and is disposed at least partially within a socket of the connector.

13. The connector assembly as recited in claim 12, wherein the socket is connected to the first receiving chamber via at least one connecting opening, and wherein the lens unit is disposed partially in the connecting opening.

14. The connector assembly as recited in claim 1, wherein the connector has a second receiving chamber which at least partially borders the first receiving chamber and in which the transmitter/receiver is disposed.

15. The connector assembly as recited in claim 14, wherein the first receiving chamber has a first partition and the second receiving chamber has a second partition, the first and second partitions separating the first and second receiving chambers from the socket, and the first partition being offset in a plugging direction from the second partition so that a step is formed in the socket.

16. The connector assembly as recited in claim 15, wherein:
a first ratio is formed by a height of a wall of the connector in a region of the socket, the wall resting against the circuit board, and a height of the step;
a second ratio is formed by a length of the transmitter/receiver and a length of a reflective surface which causes light that is coupled into the lens unit from the optical waveguide and/or the transmitter/receiver to be reflected toward the transmitter/receiver or the optical waveguide, the first ratio being equal to a reciprocal of the second ratio.

17. The connector assembly as recited in claim 15, wherein a plug end of the mating connector has a first surface portion abutting the first partition and a second surface portion abutting the second partition.

* * * * *